United States Patent

Dingwall

[15] 3,688,264

[45] Aug. 29, 1972

[54] OPERATION OF FIELD-EFFECT TRANSISTOR CIRCUITS HAVING SUBSTANTIAL DISTRIBUTED CAPACITANCE

[72] Inventor: Andrew G. F. Dingwall, Somerville, N.Y.

[73] Assignee: RCA Corporation

[22] Filed: April 22, 1971

[21] Appl. No.: 136,327

[52] U.S. Cl. ..............340/173 FF, 307/238, 307/279

[51] Int. Cl. ..........................G11c 11/40, G11c 5/02

[58] Field of Search .....340/173 R, 173 FF; 307/238, 307/279

[56] References Cited

UNITED STATES PATENTS

| | | | |
|---|---|---|---|
| 3,440,444 | 4/1969 | Rapp | 340/173 X |
| 3,535,699 | 10/1970 | Gaensslen et al. | 340/173 R |
| 3,599,180 | 8/1971 | Rubinstein | 340/173 R |

OTHER PUBLICATIONS

Electronics " Random Access MOS Memory Packs More Bits to the Chip" by Boysel et al., 2/16/70, pp. 109- 115

*Primary Examiner*—Stanley M. Urynowicz, Jr.
*Attorney*—H. Christoffersen

[57] ABSTRACT

The distributed capacitance at circuit node between conduction paths of interconnected field-effect transistors of a memory array is maintained charged to a fixed value during the major portion of the memory operating time. As one example, the distributed capacitance at the columns of an integrated circuit of a memory chip may be connected to the charging source except for the times during which any location on that chip is being accessed. Operation in this way opens sneak paths in the circuit and reduces power dissipation.

4 Claims, 4 Drawing Figures

INVENTOR.
Andrew G. F. Dingwall
BY
ATTORNEY

INVENTOR.
Andrew G.F. Dingwall
BY
ATTORNEY

INVENTOR.
Andrew G.F. Dingwall
BY
Samuel Cohen
ATTORNEY

OPERATION OF FIELD-EFFECT TRANSISTOR CIRCUITS HAVING SUBSTANTIAL DISTRIBUTED CAPACITANCE

SUMMARY OF THE INVENTION

In a field-effect transistor memory which may include a plurality of chips, each with an array of storage cells, in response to the absence of a chip select signal, a distributed capacitance charging source is connected to the circuit nodes for charging the distributed capacitance present at these nodes. In response to the presence of a chip select signal, the charging source is disconnected from all circuit nodes on that chip.

DETAILED DESCRIPTION

Copending application, Ser. No. 73,507, filed Sept. 18, 1970 now U.S. Pat. No. 3,638,039 by V. W. Chen and H. Amemiya, and assigned to the same assignee as the present application, describes the circuit shown in FIG. 1 for reducing the effect of distributed capacitance on the operation of a field-effect transistor circuit such as a field-effect transistor memory. In the condensed discussion of this circuit which follows, a relatively positive voltage level arbitrarily is assumed to represent the binary digit (bit) 1 and a relatively low voltage level such as ground is assumed to represent the bit 0. In this and the other figures, the characters P and N used to identify transistors also indicate their conductivity types.

Figure 1:
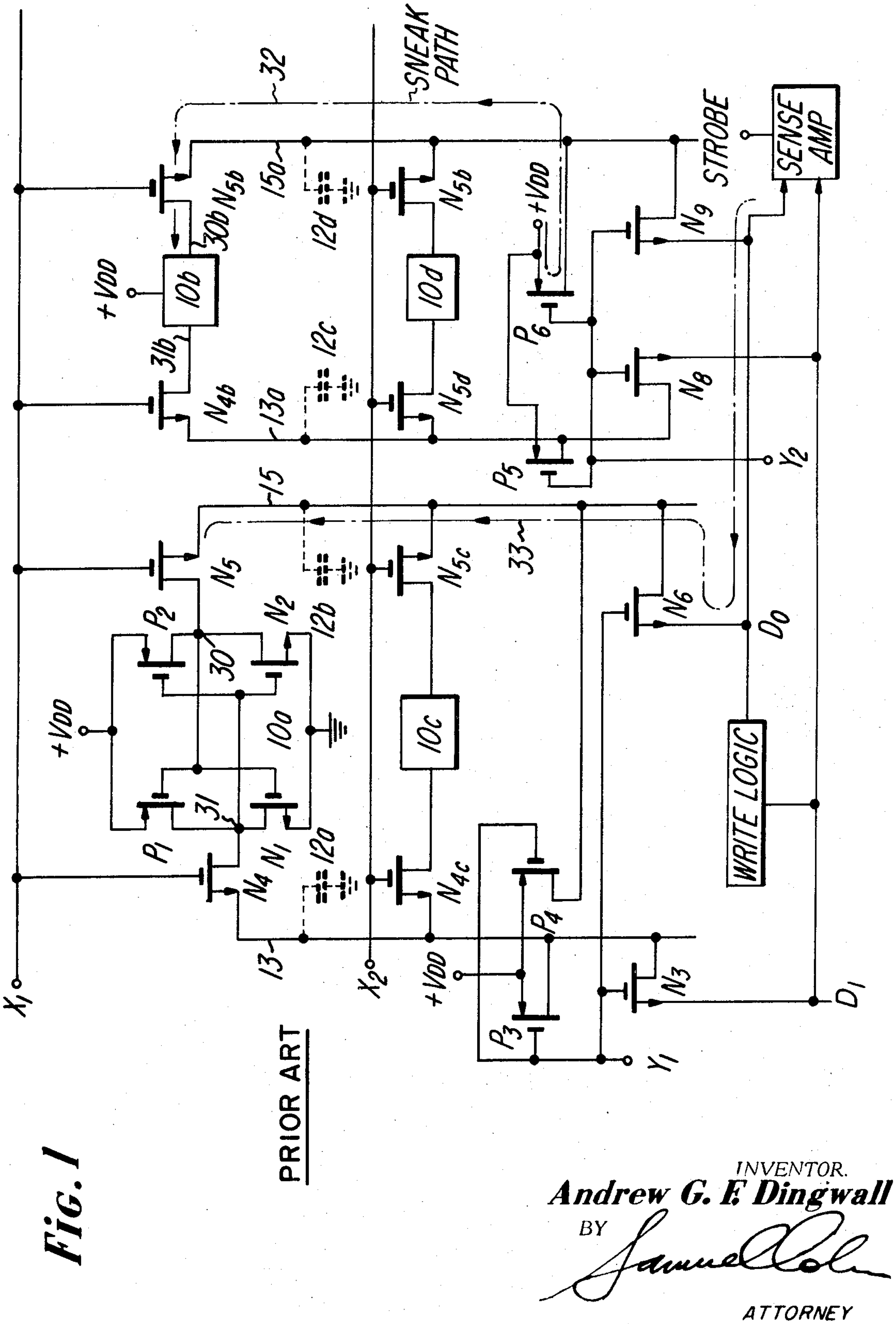
PRIOR ART Fig. 1
FIG. 1 is a block and schematic diagram of a prior art memory to illustrate the problem dealt with in this application.

Each location in the memory of FIG. 1 includes a four transistor flip-flop such as $P_1$, $N_1$, $P_2$, $N_2$ and a pair of selection transistors such as $N_4$ and $N_5$. (The flip-flop is shown schematically at location **10*a* and in block form at the other locations 10*b*–10*d*.**) Each column of the memory includes a pair of selection transistors such as $N_3$ and $N_6$. All transistors may be field-effect transistors of the metal oxide semiconductor (MOS) type.

In the operation of the memory of FIG. 1, the X and Y leads normally are at ground. To select a memory location such as $10_a$, the $X_1$ and $Y_1$ leads are made relatively positive and all the remaining X and Y leads remain at ground. Depending on the value of $D_1$ and $D_0$, a 1 or 0 may be written into the selected memory location. For example, if $D_1$ is retained at a relatively positive level (represents a 1) and $D_0$ is placed at ground (represents a 0), a 1 is written into a memory location. (Transistors $P_1$ and $N_2$ are driven into conduction and transistors $P_2$ and $N_1$ are off.) When $X_1$ and $Y_1$ are returned to ground, the flip-flop **10*a* remains in the 1 state (terminal 30 at ground and terminal 31** relatively positive). If $D_0$ represents a 1 and $D_1$ a 0 when a memory location is accessed, a 0 is written into the memory location, that is, $P_2$ and $N_1$ are driven into conduction and $P_1$ and $N_2$ are off.

The distributed capacitance present in the memory, shown in phantom view at **12*a*, 12*b*, and so on, connected between various circuit nodes and ground, adversely affects the circuit operation. For example, suppose memory location 10*b* is selected ($X_1$ and $Y_2$ are made relatively positive) and during this selection interval, location 10*a* is storing a 0 (transistors $P_2$ and $N_1$ "on"). In the absence of the circuit shortly to be described, capacitor 12 *b* will be in its discharged state. In response to the $X_1$ signal, transistor $N_5$ is turned on and terminal 30, which is at a relatively positive voltage level, attempts to charge capacitor 12*b* through transistor $N_5$. This provides the possibility for the voltage level at 30 to be pulled down sufficiently to switch transistor $P_1$ to the conducting state. Were this to occur, the state of the flip-flop at 10*a*** would be switched from the 0 to the 1 state and this, of course, would be highly disadvantageous.

The solution of the Chen et a1. application is to maintain the distributed capacitances **12*a*, 12*b*** and so on at the various circuit nodes quiescently charged to a reference level. This is accomplished by means of the charging transistors $P_3$, $P_4$, $P_5$ and $P_6$. These transistors normally are in the "on" state as $Y_1$ and $Y_2$ normally are at ground. Thus, the source $V_{DD}$ normally charges the distributed capacitances to a level close to $+V_{DD}$ via the conduction paths of those transistors.

While the above arrangement does solve the distributed capacitance problem, the charging circuit has been found to require more than a desired amount of power. The reason, the present inventor has discovered, is that sneak current paths are created during certain operations of the memory. As the memory size increases, the number of such sneak paths increases accordingly and the amount of power dissipated therefore also increases. It is desirable, of course, in a memory of this type, to reduce such power dissipation to a minimum.

FIG. 1 illustrates the above for the case of a read operation for memory location **10*a*. The select voltages $X_1$ and $Y_1$ are made relatively positive, the remaining select voltages $X_2$ and $Y_2$ remain at ground and $D_1$ and $D_0$ are both at $+V_{DD}$. Assume that memory location 10*a* is in the 1 state, that is, node 30 is at ground. In this case, current flows from the sense amplifier 19 through "on" transistors $N_6$, $N_5$ and $N_2$ to ground, as shown at 33. The voltage at $D_0$ tends to go toward ground and at $D_1$ tends to remain at $+ V_{DD}$ and strobed amplifier 19 produces an output signal. However, under this set of conditions, there is a sneak path present as shown at 32. The assumption made is that location 10*b* is storing a 1, that is, node 31*b* is relatively positive and node 30*b* is at ground. With node 31*b* relatively positive, the transistor $N_2$ of location 10*b* is in the "on" state. Accordingly, current flows from source $V_{DD}$ through charging transistor $P_6$, which is "on" as $Y_2$ is at ground, through transistor $N_{5b}$ and through transistor $N_2$ of location 10*b* to ground. If location 10*b* were in the 0 state, the sneak current path would be from $V_{DD}$ through transistors $P_5$ and $N_{4b}$, and through transistor $N_1$ of location 10*b*** to ground.

In practice, a memory such as shown in FIG. 1 may be considerably larger than the 2 by 2 locations illustrated. For example, 16 by 16 is a popular size. A memory of this type has 16 columns and 16 rows and this means that in any case in which a particular location along a row is selected for a read operation, there will be 15 sneak current paths, one for each "half selected" location along that row, drawing current. Of course, this is undesirable.

Figure 3:
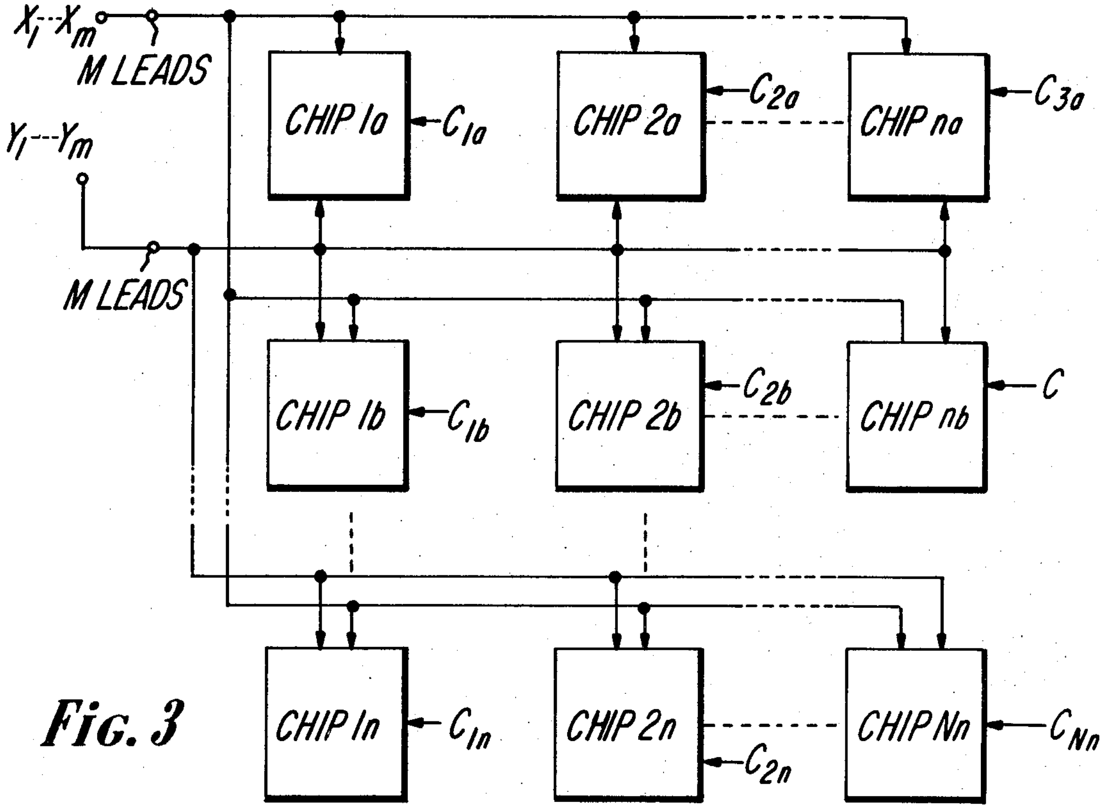
FIG. 3 is a block diagram of a memory system employing the invention.

FIG. 3 should now be referred to. It shows a memory made up of N times *n* chips, where N and *n* may or may not be equal and each may be a number such as 4, 8 or 16, as examples only. Each chip may have *m* by *m* locations, where *m* may be 16 or some other number. In the memory of the form of the invention illustrated, a chip may be addressed by applying a chip select signal $C_{jk}=$ 1 to that chip. For example, to select chip 1*a*, the signal $C_{1a}$ is made relatively positive (represents a 1) and all of the other C signals are at ground (represents a O). A location on the selected chip may be addressed by placing one of the X leads and one of the Y leads at a relatively positive value (representing a 1) and returning all other 1) and Y leads at ground (representing a O).

Figure 2:
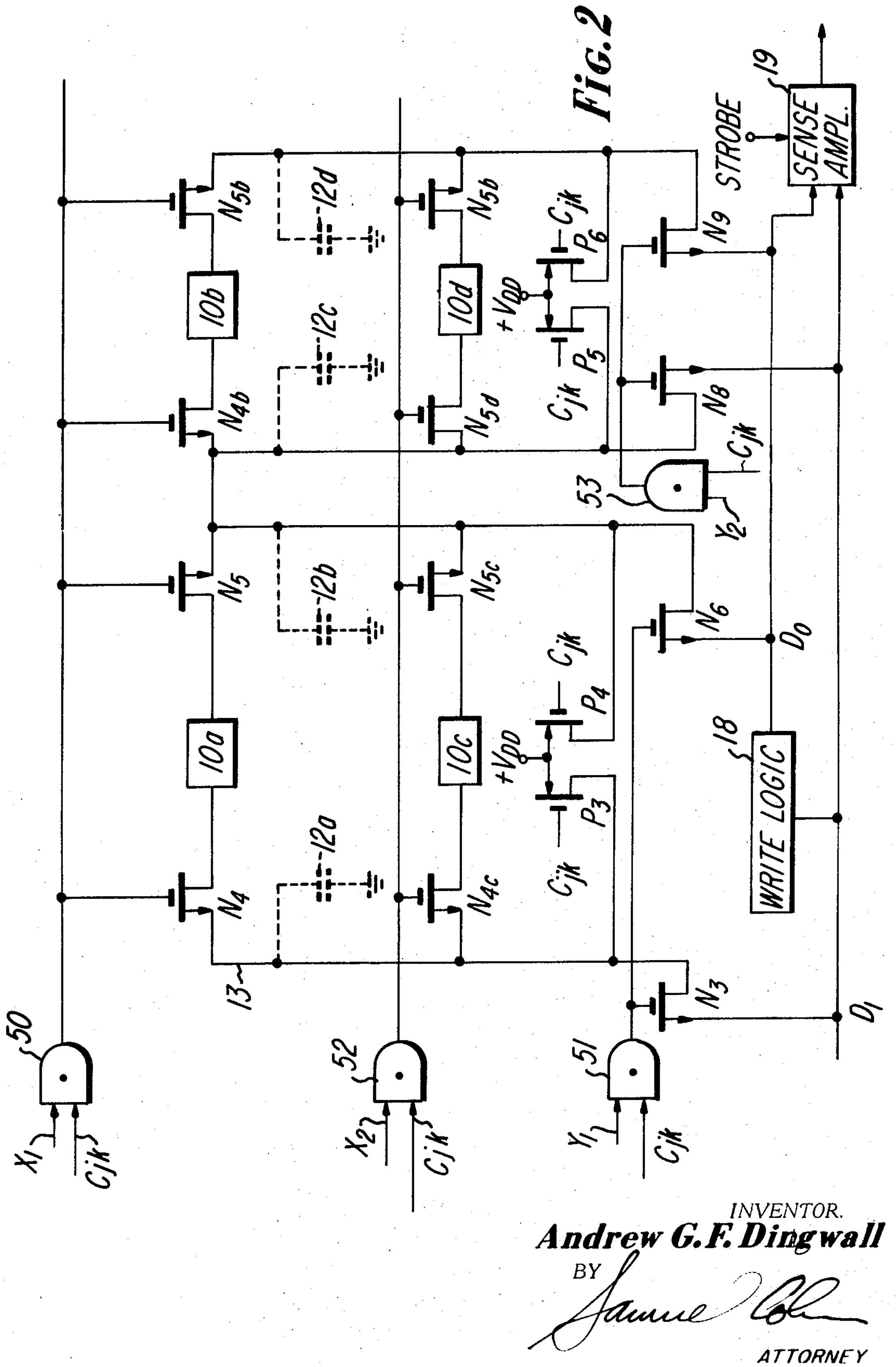
FIG. 2 is a block and schematic circuit diagram of a portion of a memory system employing the present invention.

Two by two locations of a typical chip of FIG. 3 are shown in FIG. 2. The circuit is similar to the one of FIG. 1; however, there are a number of important differences. First, there is an AND gate for selecting each row and each column two such AND gates 50 and 52 being shown for the rows and two 51 and 53 being shown for the columns. Each AND gate receives a chip select signal $C_{jk}$ and the X or Y signal for the row or column to be selected. For example, AND gate 50 receives the signals $X_1$ and $C_{jk}$ and AND gate 52 receives the signals $X_2$ and $C_{jk}$. jk. 3, 6.

In addition to the above, the distributed capacitance charging transistors, rather than being controlled by the column selection voltages Y, are instead controlled by the chip select signal $C_{jk}$. This signal $C_{jk}$ is applied to the gate electrode of transistors $P_3P_4P_5$ and $P_6$.

In operation, when the chip shown in FIG. 2 is not selected, $C_{jk}$ represents a 0 (is at ground) so that the charging transistors $P_3$, $P_4$, $P_5$ and $P_6$ are all on. The source $+V_{DD}$ therefore charges the distributed capacitances 12*a*, 12*b*, 12*c* and 12*d*. AND gates 50, 52, 51 and 53 are disabled so that the X and Y signals employed to select a memory location on a different chip do not affect any of the locations shown. Thus, if for example, $X_1$ goes positive, none of the selection transistors $N_4$, $N_5$, $N_{4b}$ or $N_{5b}$ of the chip shown is turned on so that no sneak current path exists from $+V_{DD}$ through any of the charging transistors $P_3$–$P_6$, to any location such as 10*a* or 10*b* of the first row of this or any other non-selected chip.

To select any location on the chip of FIG. 2, $C_{jk}$ must be changed to 1 (must go relatively positive) and this cuts off all of the charging transistors $P_3$, $P_4$, $P_5$ and $P_6$. Accordingly, any sneak parts such as described above from $+V_{DD}$ through a charging transistor $P_3$, $P_4$, $P_5$ and $P_6$ and to a half selected memory location automatically are open circuited. For example, if $C_{jk}$, $X_1$ and $Y_1$ are made equal to 1, selecting memory location 10*a*, there will be no sneak path to any other memory location such as 10*b* along row 1. While the output of AND gate 50 turns transistors $N_{4b}$ and $N_{5b}$ on, current cannot flow from $+V_{DD}$ through transistor $N_{4b}$ or $N_{5b}$ to ground, as transistors $P_5$ and $P_6$ are in their off condition.

In practicing the invention, all chip select voltages periodically, such as once each read-write cycle, are placed at ground. This is to permit addresses to be changed without introducing undesired information transfers. During this brief portion of the memory cycle the nodes at which the distributed capacitances 12*a*, 12*b* and so on are present are at $+V_{DD}$ so that no false write is possible. Since no outputs are "desired" during these brief intervals, the chip readily can be "deselected" with minimum loss of useful cycle time.

Figure 4:
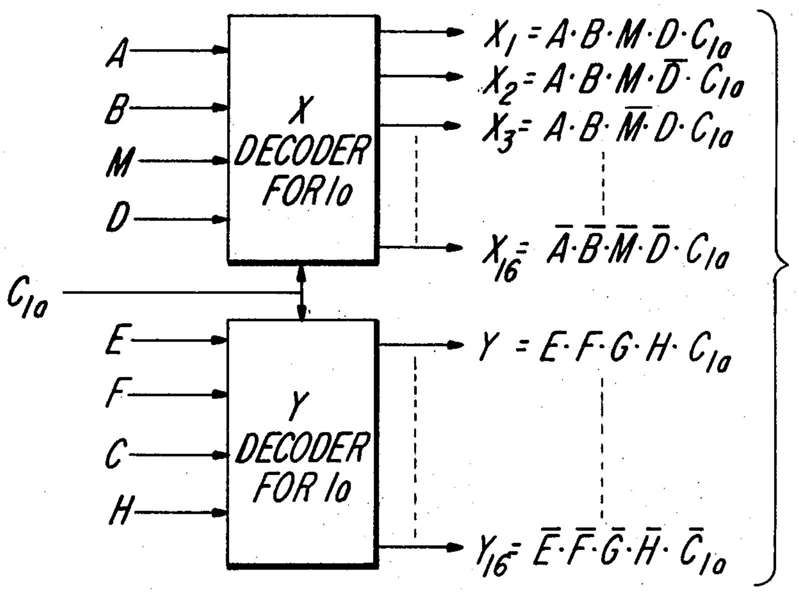
FIG. 4 is a block diagram of a portion of a memory system useful in practicing the present invention.

For purposes of the present explanation, the system of FIG. 2 is shown to include an AND gate for each column conductor and each row conductor. In practice, the system may be simplified by applying the chip select signal C to the decoders which produce the X and Y select signals. Each chip may have a pair of decoders, one an X decoder and the other a Y decoder as shown in FIG. 4. For 16-by-16 memory chips, each decoder has four input signals such as A,B,M,D for the X decoder of FIG. 4 and a fifth signal, namely a chip select signal such as $C_{1a}$. Each decoder has 16 output leads, one for each row in the case of the X decoder, and one for each column in the case of the Y decoder. These various outputs represent the 16 different combinations of four variables, as illustrated. For example, $X_1 = A{\cdot}B{\cdot}M{\cdot}D{\cdot}C_{1a}$; $X_2 = A{\cdot}B{\cdot}M{\cdot}\overline{D}{\cdot}C_{1a}$; and so on. The logic stages within the blocks for performing these logic functions are conventional.

With the circuit operated in this way, the AND gates may be eliminated from the circuit of FIG. 2 since $X_1$, $X_2$ and so on and $Y_1$, $Y_2$ and so on, already are logic functions which depend upon the value of the chip select signal $C_{jk}$ (where $j=1$ and $k=a$ for the example shown in FIG. 4). In other respects, the circuit of FIG. 2 is the same and operates the way already discussed.

While the invention has been discussed in terms of C-MOS memory cells, it should be clear that the invention is equally applicable to P-MOS and N-MOS memory cells. It should also be clear that the select transistors, while shown to be of N-type can be of P-type and similarly the distributed capacitance charging transistors can be of N-type rather than P-type, depending upon the particular engineering design. It should also be understood that while in the particular example of the invention illustrated, the distributed capacitors are maintained charged to a positive level $+V_{DD}$, with other circuit designs it may be preferable to maintain the capacitors charged to some other reference value such as to a negative voltage level or to ground. In each case this will depend upon the particular type of memory cell employed and other design criteria.

An important feature of the system of the present invention is that it operates well no matter how many levels of decoding or buffering are used. Another is that power dissipation is minimized. The operation of the circuit of the invention is very fast, much faster than an alternative and less desirable approach of connecting resistors having some fixed value across the distributed capacitances.

What is claimed is:

1. In a field-effect transistor memory array, in combination:

a plurality of groups of field-effect transistor storage cells;

a plurality of circuit nodes coupled to said groups of said storage cells, each node exhibiting distributed capacitance;

a plurality of charging means, one such means for each group of cells, each means coupled to the nodes for a different group of cells, each means for normally maintaining the capacitance at the nodes to which it is connected charged to a reference value;

cell selection means for selecting a desired one of said cells comprising normally open switch means connecting a circuit node to said cell, and means responsive to a control signal calling for the selection of a group of cells and a select signal manifestation calling for a cell within that group for closing said switch means; and means responsive to said signal calling for the selection of a group of cells for disconnecting said charging means from the nodes for that group of cells.

2. In an integrated circuit memory system which includes a plurality of memory chips, each chip comprising an array of field-effect transistor memory cells, each column of each memory array exhibiting substantial distributed capacitance, and further including for each array charging means connected to said columns of said array for normally maintaining the distributed capacitances of that array charges to a reference level, the improvement comprising:

means for accessing a memory cell on one of said chips comprising means for applying to that chip a chip select signal and for applying to the desired cell on that chip a row select signal and a column select signal; and means responsive to said chip select signal for disconnecting said charging means for said chip from the columns of that chip.

3. In the memory system as set forth in claim 2, said means for accessing a location comprising logic gate means for each row of the memory responsive to the concurrent presence of a row select signal manifestation and said chip select signal, for applying said select signal to all cells of a row only when a chip select signal is present.

4. In the memory system as set forth in claim 2, said last named means comprising field-effect transistors whose conduction paths are connected between said charging means and the respective columns.

* * * * *